UNITED STATES PATENT OFFICE.

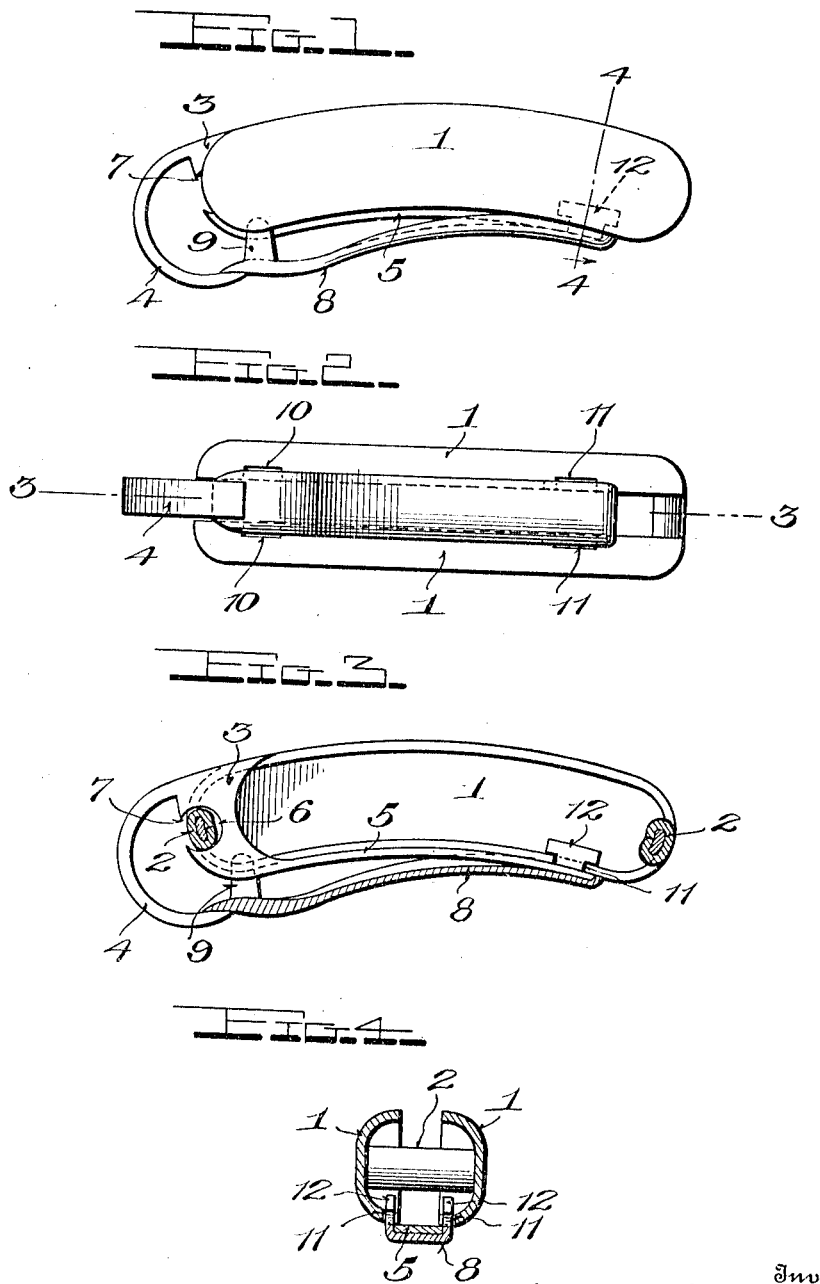

CHARLES R. TOST, OF CRANSTON, RHODE ISLAND, ASSIGNOR TO THE HADLEY COMPANY, OF PROVIDENCE, RHODE ISLAND.

CATCH FOR BRACELETS.

1,316,869.      Specification of Letters Patent.      Patented Sept. 23, 1919.

Application filed January 17, 1919. Serial No. 271,700.

*To all whom it may concern:*

Be it known that I, CHARLES R. TOST, a citizen of the United States, residing at Cranston, in the county of Providence and State of Rhode Island, have invented a new and useful Improvement in Catches for Bracelets, of which the following is a specification.

This invention relates to certain new and useful improvements in a catch for bracelets and more particularly to the formation and mounting of the tongue guard on the link construction, the same being an improvement on allowed application Serial Number 250848, filed August 21, 1918.

The former construction consisted of a hook part and a link part connectible through relative angular movement said hook part carrying a shank adapted to lie against the link, when the parts are interlocked, where it was held by means of a spring guard tongue which was secured to the link clips over the shank. These clips have been found detrimental, and unless great care was taken in forming them, they might injure the flesh.

The present invention resides in an improved spring tongue construction and means for interlockingly connecting the same to the link body, whereby the clips for securing the tongue are dispensed with and a smooth back formed.

More specifically, the invention consists of a spring tongue which is dished or concaved in cross section so as to house and conceal the shank of the hook, and a pair of headed locking projections or lugs extending between the sides of the link and interlocking therewith upon assembling the parts or sections thereof whereby to firmly secure and anchor the tongue in position, and present a smooth unobstructed back.

In the drawings—

Figure 1 is a side elevation of the improved catch structure.

Fig. 2 is a bottom or inside elevation thereof.

Fig. 3 is a longitudinal section approximately on line 3—3 of Fig. 2, and

Fig. 4 is a transverse section on line 4—4 of Fig. 1.

The link body comprises a pair of dished side link parts 1 having inwardly extending oval-sectioned telescopic posts 2 for frictionally connecting said side parts.

The hook part 3 embodies a curved bill 4 and a shank 5, the main portion or base of the hook being formed with a circular opening 6 having a diameter slightly greater than the major diameter of the posts 2 to permit of one of the same being received and rotated therein after entering through a gate 7 which is of less width than the major diameter but greater than the minor diameter of the post. To connect the hook part and link together, the shank 5 is disposed substantially at right angles to the link and the post 2 moved into the opening 6 through the gate 7, subsequent to which said shank is swung or folded up against the link, as disclosed in Figs. 1 and 3.

The spring tongue or guard 8 is anchored at one end to the link over the free end of the shank and the opposite end is offset outwardly to have contact with the bill 4. This offset yieldable tongue end carries a pair of guide ears 9 which straddle the shank of the hook and extend inwardly between the side link parts or sections through a pair of opposing recesses 10 in the adjacent edges of the link parts.

In the opposite end portion of the side parts is provided a second pair of opposing edge recesses 11 which receive the stem portions of T-shaped locking projections or lugs 12 that constitute means for anchoring the adjacent end of the tongue to the link. The locking projections extend inwardly from the opposite edges of the dished portion of the tongue, such edges or flanges 13 extending inwardly over the sides of the shank 5 to house and conceal the same.

In assembling the catch link and prior to completely closing the side link parts together, the hook part is interlocked with one end post 2 and the shank folded up against the link. The tongue is then placed over the shank so that upon completely telescoping the post parts and bringing the side link parts together, the stems of the T-projections will enter the recesses 11 whereby the side inner edges of said link parts will engage beneath the cross bar heads of said projections.

Thus, the tongue will be firmly anchored to the link simply by the necessary step of bringing the side parts together, such anchoring means being concealed to view and inaccessible without destroying the entire unit. The dished formation of the tongue conceals the hook shank, effecting a neat smooth finish as well as guarding against the free end of said shank catching or snagging beneath the sleeve.

Having thus described my invention, what I claim as new and desire to secure by Letters Patent is—

1. A catch for bracelets comprising a link formed of spaced side parts connected by telescopic posts and having their edges provided with spaced pairs of opposing recesses, a hook part connectible with one post and formed with a shank extending alongside of the link parts, a guard tongue for the hook part dished to receive and house the shank at one end and offset outwardly therefrom at its opposite end against the bill of the hook part, guide ears on the offset end of the tongue straddling the shank and operable in one pair of opposing recesses, and a pair of locking T-shaped projections carried by the opposite end of the tongue in straddling relation to the shank and having their stems disposed in the other pair of opposing edge recesses whereby the heads of the projections will interlock with the side link parts to secure the tongue in position.

2. A catch for bracelets, comprising a link formed of two sections, a hook connected therewith, a spring tongue connected to the link to present an unobstructed surface.

3. A catch for bracelets comprising side link parts formed in one end portion with opposing edge recesses, and a guard tongue having inturned headed projections extending between the parts with their stem portions engaging in the recesses thereof.

4. A catch for bracelets comprising side link parts of dished section formed with a pair of opposing edge recesses, a hook part interlocking with said side parts, and a coöperable spring tongue having headed means interlocking in the opposing recesses of said link parts.

In testimony whereof I have signed my name to this specification in the presence of two subscribing witnesses.

CHARLES R. TOST.

Witnesses:
ADA E. HAGERTY,
J. A. MILLER.

Copies of this patent may be obtained for five cents each, by addressing the "Commissioner of Patents, Washington, D. C."